United States Patent
Hudek et al.

(10) Patent No.: US 12,106,926 B2
(45) Date of Patent: Oct. 1, 2024

(54) ATOMIC OVENS BASED ON ELECTRIC DISCHARGE

(71) Applicant: IonQ, Inc., College Park, MD (US)

(72) Inventors: Kai Hudek, Hyattsville, MD (US); Jason Madjdi Amini, Takoma Park, MD (US)

(73) Assignee: IonQ, Inc., College Park, MD (US)

( * ) Notice: Subject to any disclaimer, the term of this patent is extended or adjusted under 35 U.S.C. 154(b) by 0 days.

(21) Appl. No.: 18/355,165

(22) Filed: Jul. 19, 2023

(65) Prior Publication Data

US 2024/0047166 A1 Feb. 8, 2024

Related U.S. Application Data

(63) Continuation of application No. 17/169,244, filed on Feb. 5, 2021, now Pat. No. 11,749,488.

(60) Provisional application No. 62/972,368, filed on Feb. 10, 2020.

(51) Int. Cl.
| | |
|---|---|
| *H01J 29/70* | (2006.01) |
| *B82Y 10/00* | (2011.01) |
| *G06N 10/00* | (2022.01) |
| *G06N 10/40* | (2022.01) |
| *H01J 29/96* | (2006.01) |
| *H05H 3/02* | (2006.01) |

(52) U.S. Cl.
CPC ............ *H01J 29/70* (2013.01); *B82Y 10/00* (2013.01); *G06N 10/00* (2019.01); *G06N 10/40* (2022.01); *H01J 29/96* (2013.01); *H05H 3/02* (2013.01)

(58) Field of Classification Search
CPC ......... H01J 29/70; H01J 29/96; G06N 10/00; G06N 10/40; B82Y 10/00; H05H 3/02
See application file for complete search history.

(56) References Cited

U.S. PATENT DOCUMENTS

| | | | |
|---|---|---|---|
| 2005/0126487 A1 | 6/2005 | Tabuchi et al. | |
| 2016/0118231 A1 | 4/2016 | May | |
| 2017/0316335 A1* | 11/2017 | Kim | ....................... G06N 10/00 |

* cited by examiner

*Primary Examiner* — Sean M Luck
(74) *Attorney, Agent, or Firm* — ARENTFOX SCHIFF LLP

(57) ABSTRACT

Aspects of the present disclosure describe an atomic oven including a cathode, an anode that comprises a source material, and a power supply that provides a voltage between the cathode and the anode, wherein applying the voltage causes multiple electrons from the cathode to ablate the source material from the anode or locally heat the anode to cause source material to evaporate from the anode and, in both case, to produce a stream of ablated or evaporated particles that passes through an opening in the cathode.

20 Claims, 5 Drawing Sheets

ATOMIC OVENS BASED ON ELECTRIC DISCHARGE

CROSS-REFERENCE TO RELATED APPLICATIONS

The current application is a continuation of U.S. application Ser. No. 17/169,244, filed Feb. 5, 2021, which claims priority to and the benefit of U.S. Provisional Application No. 62/972,368 filed on Feb. 10, 2020, entitled "Atomic Ovens Based on Electric Discharge," the contents of each of which are incorporated herein by reference in their entireties.

BACKGROUND

Aspects of the present disclosure relate generally to an atomic oven that produces a flux based on a discharge of electrons that causes ablation of a source material.

An atomic flux may be generated and used as a source of neutral atoms or ions for certain systems. Some of those systems may include quantum information processing (QIP) systems, for example. Trapped ions are one of the leading implementations of QIP systems. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other using suitable external control fields such as optical or microwave fields. These attributes make atomic-based qubits attractive for extended quantum operations such as quantum computations or quantum simulations.

A typical process for trapping ions generally includes heating a source material to the point of sublimation. The heating generates an atomic flux which overlaps with the trapping potentials and laser cooling light either over or inside an RF Paul trap, depending on the configuration. Preferably, the heating occurs behind an aperture such that atomic flux is not deposited on the electrodes of the radio frequency Paul trap, possibly damaging the trap. The heating of the atomic source may take two forms: (1) resistive heating from a current driven through mechanical pieces holding the atomic source, and (2) ablation of the atomic source with a high intensity laser pulse. However, resistive heating may be too slow for use with QIP systems and ablation with a laser may require complex optics and fittings. Therefore, improvements in generating an atomic flux may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of this disclosure an atomic oven is described that includes a cathode, an anode that comprises a source material, and a power supply that provides a voltage between the cathode and the anode, wherein an application of the voltage causes multiple electrons from the cathode to ablate the source material from the anode to produce a stream of ablated particles having neutral particles, charged particles, or both, and wherein the stream passes through an opening formed by the cathode.

In another aspect of this disclosure a quantum information processing (QIP) system for controlling quantum states of ions in an ion chain to perform a quantum operation is described that includes a trap configured to trap the ions to implement the ion chain and an atomic oven that provides a stream of ablated particles having the ions, neutral atoms, or both for trapping by the trap. The atomic oven may include a cathode, an anode that comprises a source material, and a power supply that provides a voltage between the cathode and the anode, wherein an application of the voltage causes multiple electrons from the cathode to ablate the source material from the anode or locally heat the anode to cause source material to evaporate from the anode and, in both cases, to produce the stream having the ions, neutral atoms, or both, and wherein the stream passes through an opening formed by the cathode and directed to the trap.

Some aspects of the present disclosure include a method including applying a voltage between a cathode and an anode, ablating the anode to sputter materials off of the anode or locally heating the anode to evaporate the anode material, and providing a stream of at least one of neutral atoms or ions produced through an opening of the cathode, wherein the stream includes a portion of the materials sputtered off or evaporated off of the anode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
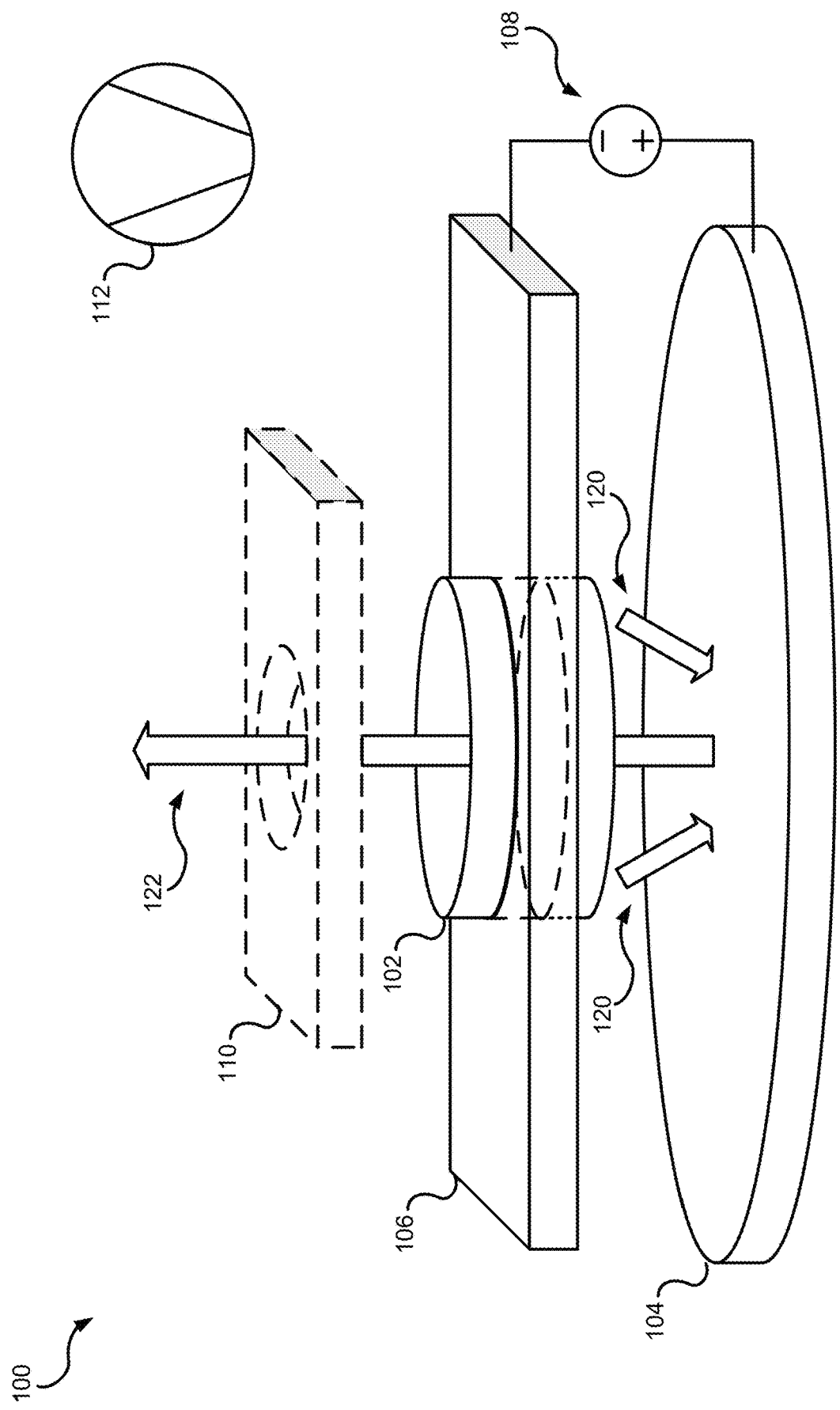
FIG. 1 is a diagram illustrating an example of an atomic oven according to some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As described above, trapped ions may be used to implement qubits used in quantum information processing (QIP) systems. A typical ion trap geometry or structure used for quantum information and metrology purposes is the radio frequency (RF) Paul trap (also referred to as an RF trap or simply a Paul trap), where nearby electrodes hold static and dynamic electrical potentials that lead to a confinement of the ions. Qubits based on trapped ions may be used as different types of devices, including but not limited to quantum memories, quantum gates in quantum computers and simulators, and nodes for quantum communication networks. To implement qubits based on trapped ions, atomic ovens are generally used to transform a solid material into a gaseous form that is amenable to the techniques of trapping and laser cooling. But the atomic ovens can suffer from issues such as thermal time constants, vacuum degradation, or need for optical access. Accordingly, this disclosure describes novel techniques that provide some of the advantages of direct resistive heating from a current driven through mechanical pieces holding the atomic source and the ablation of the atomic source with a high intensity laser pulse, while also overcoming some of their drawbacks. Specifically, the present disclosure describes an atomic oven that produces a flux based on a discharge of electrons that causes ablation of a source material. For example, an atomic oven design is proposed that is based on ablation from an anodic vacuum arc.

As used in this disclosure, the terms "atoms" and "neutral atoms" may be interchangeable, while the terms "ions" and "atomic ions" may be interchangeable. Moreover, the terms "atomic ions," "ions," "atoms," and "neutral atoms" may describe the particles that are generated from a source material and that are to be confined or trapped, or are actually confined or trapped, in a trap to form a crystal, lattice, or similar arrangement or configuration. The term "plasma" may describe a flux of neutral atoms, ions, or both.

In some aspects of the present disclosure, an atomic oven may be disposed in an ultra-high vacuum chamber and nearby a trap. The atomic oven may be an integrated module that includes an anode and a cathode. A voltage or potential may be applied between the anode (e.g., a target material or source material to be ablated or evaporated) and the cathode, which creates an electric field in a gap between the anode and the cathode. The voltage can be a static voltage or can be a time varying voltage. When an arc is formed between the anode and the cathode (e.g., breakdown), the electrons from the cathode may be accelerated by the electric field toward the anode (e.g., electron bombardment of the target material). The electrons may ablate the anode (e.g., the target material) or may locally heat the anode, and a flux of atomic particles (i.e., elements and/or compounds) and/or ions may be released from the surface of the anode. An aperture may be used to produce a quasi-collimated stream or beam of ablated or evaporated material. The flux may be used as a source of particles for trapping in the trap. In one example, neutral atoms are confined in the trap and photoionized to produce a chain or lattice of trapped ions.

An aspect includes a quantum information processing (QIP) system including a trap configured to implement an ion chain with ions and an atomic oven that provides a stream of ablated or evaporated particles with the ions for trapping by the trap, wherein the atomic oven includes a cathode, an anode, and a power supply as described above, and wherein the stream of ablated or evaporated particles produced from ablation or evaporation of the source material passes through an opening in the cathode and directed to the trap.

As shown in FIG. 1, in a non-limiting example, an atomic oven 100 may include a cathode 102 that supplies electrons for ablation. The cathode 102 may be made of a hard conductive material. In an example, the cathode 102 may include tungsten or graphite or some material suitable as a source of electrons for electron bombardment. The atomic oven 100 may include an anode 104 that includes the target or source material that is used to produce the particles for populating a trap with trapped ions. For example, the anode 104 may include materials such as ytterbium or barium. The anode 104 need not be limited to ytterbium or barium and can be made of or include other elements that can also produce particles for populating a trap. The atomic oven 100 may include a holder 106 that holds the cathode 102. The holder 106 may have the same material as the cathode 102 (e.g., tungsten or graphite), or a non-conducting material such as aluminum oxide. The atomic oven 100 may include a power supply 108 that provides RF or direct current (DC) electrical energy for creating an electric field between the cathode 102 and the anode 104 that accelerates electrons for ablating the anode 104. The power supply 108 may be an RF, DC, or pulsed voltage supply or a current supply.

In one aspect of the present disclosure, the cathode 102 may be in the form of a ring. The cathode 102 may extend into or through the holder 106. For example, the cathode 102 may be a cylindrical ring that extends above and below the holder 106. Other configurations of the cathode 102 and/or the holder 106 are possible.

In some implementations, the atomic oven 100 may optionally include a shield 110 that can be used to collimate an atomic flux or plasma stream 122 by placing the shield 110 in a path of the beam, stream, or flow of particles produced by the ablation of the anode 104. The shield 110 may be a separate piece or integrated into the holder 106. The shield 110 may prevent or minimize ablative by-products from being deposited on unintentional places. For example, the shield 110 may keep any ablative by-products out of the atomic beam (e.g., the plasma stream 122).

A QIP system may include a vacuum pump system 112 that decreases the chamber pressure, and therefore the pressure in the atomic oven 100, to high vacuum, ultra-high vacuum, or extreme high vacuum. In one example, the vacuum pump system 112 may include one or more of an ion pump, a mechanical pump, a rotary pump, a cryogenic pump, and/or a turbo pump.

During operation, in one implementation, the vacuum pump system 112 may decrease the chamber pressure down to $10^{-6}$ Torr, $10^{-7}$ Torr, $10^{-8}$ Torr, $10^{-9}$ Torr, $10^{-10}$ Torr, $10^{-11}$ Torr, or other vacuum pressure appropriate for ablation. After the chamber pressure has been reduced to the appropriate vacuum pressure, the power supply 108 may apply a voltage between the anode 104 and the cathode 102. There may be different modes of operation including a first mode in which there is a steady state plasma formation by the ablation resulting from the application of the voltage and so the plasma is generated and maintained in the gap where a continuous source of atomic material can be generated from the plasma. In a second mode, the application of the voltage results in a short burst of plasma or an arc of plasma to create a pulsed source of atomic material. As such, the power supply 108 may apply continuous or pulsed voltage signals between the anode 104 and the cathode 102. The applied voltage may cause an electrical breakdown between the anode 104 and the cathode 102. The electrical breakdown may create a continuous or pulsed arc 120 between the cathode 102 and the anode 104. Electrons in the arc 120 may ablate the anode 104, causing materials in the anode 104 to sputter off the anode 104 or be evaporated from the anode due to local heating to create a plasma stream 122.

In an aspect of the modes of operation, a time-varying signal can be applied to the power supply 108 in order to create the necessary conditions for a single arc ablation of the anode 104, which includes a fast turn on to high-voltage to spark the arc, a fast current clamp or voltage swing downward to maintain the arc for a set amount of time, and then a fast shut off. This allows for a rapidly triggerable, controllable atomic flux with minimal heating or degradation of the vacuum.

The plasma stream 122 may include positive particles and/or neutral particles of the materials in the anode 104 as a result of the ablation process. For example, the positive or charged particles may include ions or atomic ions of the material of the anode 104 (e.g., the target materials), while the neutral particles may include atoms or neutral atoms of the material of the anode 104. The plasma stream 122 may be referred to as a source, where for the charged particles the source may be referred to as an atomic ion source and for the neutral particles the source may be referred to as an atomic neutral source. The plasma stream 122 may sustain the arc 120 (e.g., ions in the plasma stream 122 may sustain the arc 120). The plasma stream 122 may pass through an opening formed by the cathode 102 and through an opening formed by the shield 110 when such a shield is used. The plasma stream 122 may provide the particles used for populating the trapped ions.

Additional fields, e.g., magnetic fields or electrical fields, can be applied to separate and purify the plasma stream 122 if necessary, or be used to direct the ionic portion of the plasma stream 122 elsewhere (e.g., not line of sight).

In an aspect of the modes of operation, the shield 110 might be biased with respect to the cathode 102 and/or the anode 104 to reflect ions from the stream 122 and allow only neutral atoms to continue through the shield 110. This results in a stream 122 exiting the shield 110 that contains predominantly neutral atoms.

In some examples, the atomic oven 100 may be smaller than 1 centimeter, 5 millimeters, 3 millimeters, 2 millimeters, or smaller on a side. The atomic oven 100 may be implemented as a single, integrated module for various vacuum systems, such as a QIP system.

Figure 2:
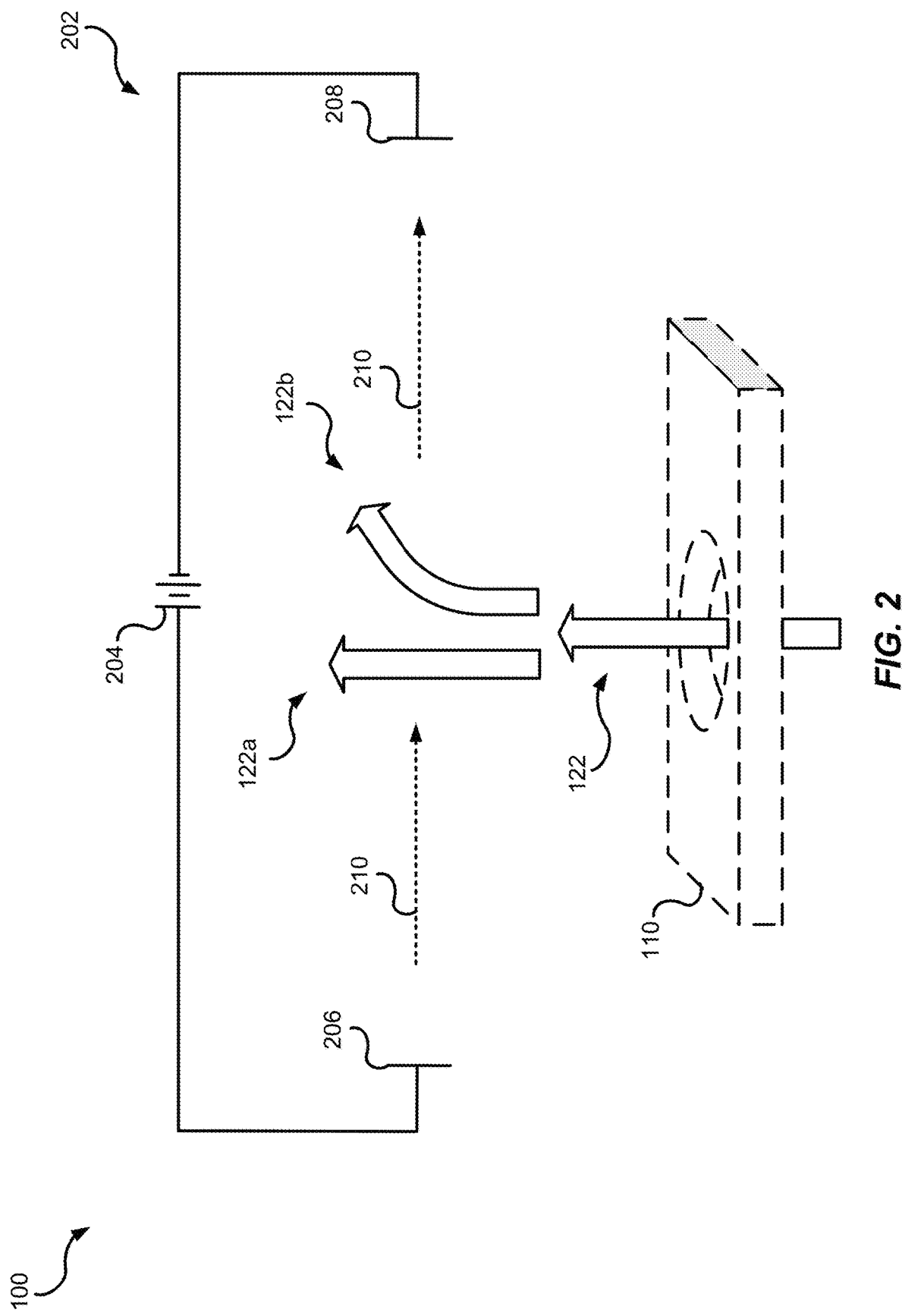
FIG. 2 is a diagram illustrating an example of a biasing circuit according to some aspects of the present disclosure.

Referring now to FIG. 2, and referencing FIG. 1, the atomic oven 100 may include a biasing system 202 having a biasing voltage source 204 that applies an electric field 210 transversely across the plasma stream 122 between a positive terminal 206 and a negative terminal 208. The electric field 210 may separate the plasma stream 122 into a first stream 122a and a second stream 122b. The first stream 122a may include neutrally charged particles (e.g., atoms or neutral atoms) in the plasma stream 122 whose trajectories are not affected by the electric field 210. The second stream 122b may include positively charged particles (e.g., ions or atomic ions) in the plasma stream 122 whose trajectories are affected by the electric field 210. For example, the electric field 210 may cause the second stream 122b to drift away from the positive terminal 206 and toward the negative terminal 208. The biasing voltage source 204 may be adjusted to control the intensity of the electric field 210. The intensity of the electric field 210 may control how sharply the second stream 122b bends. In some instances, the intensity of the electric field 210 may be adjusted based on the target materials in the anode 104. For example, if the target material in the anode 104 is "heavy," a higher electric field 210 may be used to separate the first stream 122a and a second stream 122b. If the target material in the anode 104 is "light," a lower electric field 210 may be used to separate the first stream 122a and a second stream 122b.

In one example, the electric field 210 may filter the plasma stream 122 by separating a number of charged particles in the plasma stream 122. For example, under the application of the electric field 210, a first type of charged particles in the plasma stream 122 (i.e., having a first mass) may drift away from the positive terminal 206 to form a first filtered stream, a second type of charged particles in the plasma stream 122 (i.e., having a second mass) may form a second filtered stream, and so forth.

In some implementations, particles in the first stream 122a may be utilized to provide the particles used to populate a trap for the trapped ions. In other implementations, particles in the second stream 122b may be utilized to provide the particles used to populate a trap for the trapped ions.

It is to be understood that while purifying, separating, and/or steering aspects are described above in connection with an electric field, the disclosure need not be so limited and magnetic fields or a combination of magnetic fields and electric fields may also be used for similar purposes. Moreover, while two separate streams, flows, or fluxes are shown in connection with FIG. 2, it is to be understood that these techniques may be used to produce any number of separate streams, flows, or fluxes that are appropriate for a particular application.

Figure 3:
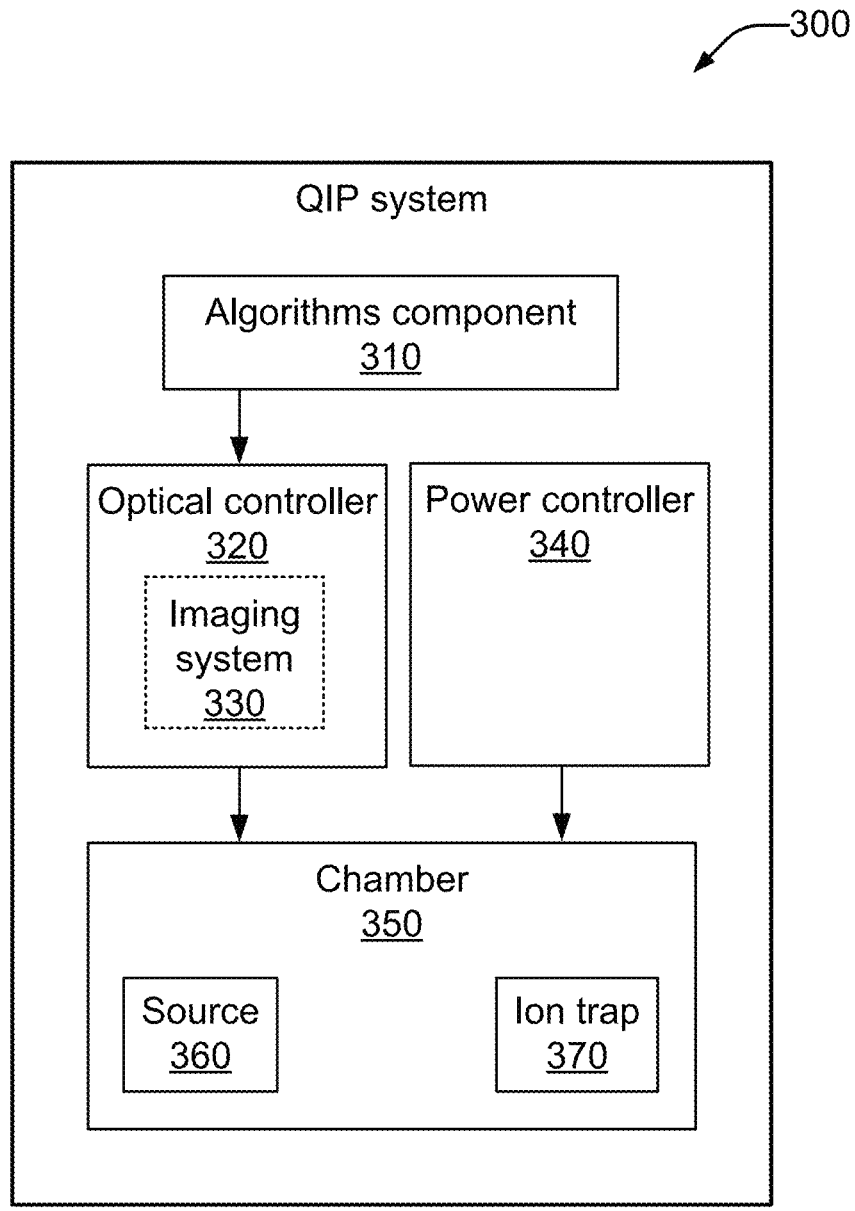
FIG. 3 is a block diagram that illustrates an example of a quantum information processing (QIP) system in accordance with aspects of this disclosure.

FIG. 3 is a block diagram that illustrates an example of a QIP system 300 in accordance with aspects of this disclosure. The QIP system 300 may also be referred to as a quantum computing system, a computer device, a trapped ion system, or the like.

The QIP system 300 can include a source 360 that provides atomic species (e.g., a plume or flux of neutral atoms) to a chamber 350 having an ion trap 370 that traps the atomic species once ionized (e.g., photoionized). In an example, the source 360 may correspond to the atomic oven 100 described above in connection with FIGS. 1-2. In one example, a power controller 340 may supply the electrical energy used by the source 360 (e.g., the atomic oven 100) to generate an atomic flux.

The imaging system 330 can include a high resolution imager (e.g., CCD camera) for monitoring the atomic ions while they are being provided to the ion trap or after they have been provided to the ion trap 370. In an aspect, the imaging system 330 can be implemented separate from the optical controller 320; however, the use of fluorescence to detect, identify, and label atomic ions using image processing algorithms may need to be coordinated with the optical controller 320.

The QIP system 300 may also include an algorithms component 310 that may operate with other parts (not shown) of the QIP system 300 to perform quantum algorithms or quantum operations, including a stack or sequence of combinations of single qubit operations and/or multi-qubit operations (e.g., two-qubit operations) as well as extended quantum computations. As such, the algorithms component 310 may provide instructions to various components of the QIP system 300 (e.g., to the optical controller 520) to enable the implementation of the quantum algorithms or quantum operations.

Figure 4:
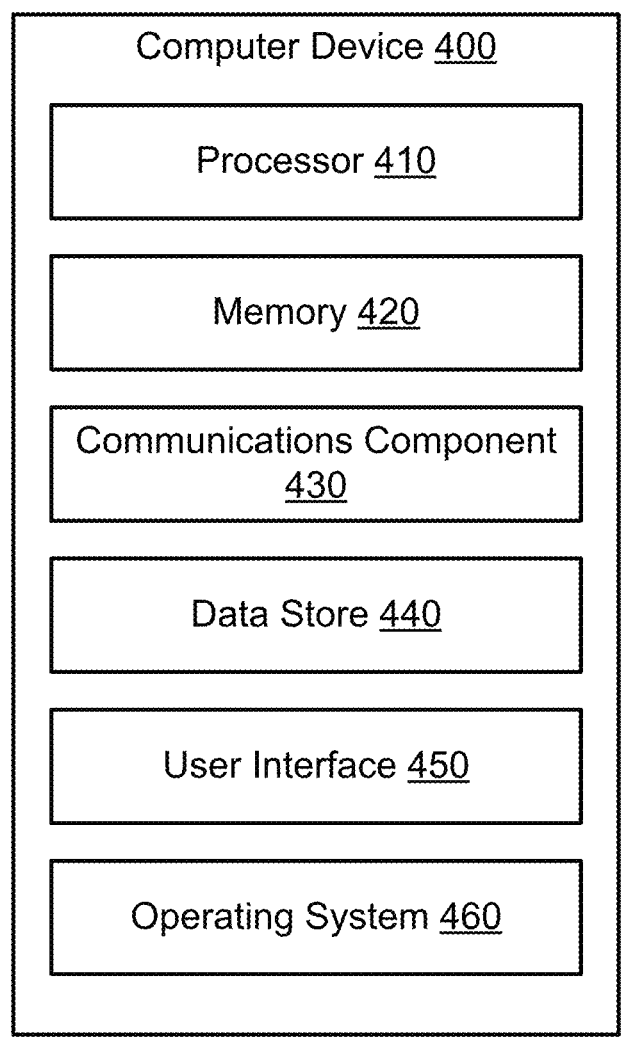
FIG. 4 is a diagram that illustrates an example of a computer device in accordance with aspects of the disclosure.

Referring now to FIG. 4, illustrated is an example computer device 400 in accordance with aspects of the disclosure. The computer device 400 may represent a single computing device, multiple computing devices, or a distributed computing system, for example. The computer device 400 may be configured as a quantum computer (e.g., a quantum information processing (QIP) system), a classical computer, or a combination of quantum and classical computing functions. For example, the computer device 400 may be used to process information using quantum algorithms based on trapped ion technology and may therefore implement methods for independent control of Raman optical beams in a multi-channel acousto-optic modulator, as applied to quantum logic gates, and in connection with generalized interactions between qubits. A generic example of the computer device 400 as a QIP system that may implement the various beam controls described herein is illustrated in an example shown in FIG. 3.

In one example, the computer device 400 may include a processor 410 for carrying out processing functions associated with one or more of the features described herein. The processor 410 may include a single or multiple set of processors or multi-core processors. Moreover, the processor 410 may be implemented as an integrated processing system and/or a distributed processing system. The processor 410 may include a central processing unit (CPU), a quantum processing unit (QPU), a graphics processing unit (GPU), or combination of those types of processors. In one aspect, the processor 410 may refer to a general processor of the computer device 400, which may also include additional processors 410 to perform more specific functions such as functions for individual beam control.

In an example, the computer device 400 may include a memory 420 for storing instructions executable by the processor 410 for carrying out the functions described herein. In an implementation, for example, the memory 420 may correspond to a computer-readable storage medium that stores code or instructions to perform one or more of the functions or operations described herein. In one example, the memory 420 may include instructions to perform aspects of methods in accordance with the present disclosures. Just like the processor 410, the memory 420 may refer to a general memory of the computer device 400, which may also include additional memories 420 to store instructions and/or data for more specific functions such as instructions and/or data for individual beam control.

Further, the computer device 400 may include a communications component 430 that provides for establishing and maintaining communications with one or more parties utilizing hardware, software, and services as described herein. The communications component 430 may carry communications between components on the computer device 400, as well as between the computer device 400 and external devices, such as devices located across a communications network and/or devices serially or locally connected to computer device 400. For example, the communications component 430 may include one or more buses, and may further include transmit chain components and receive chain components associated with a transmitter and receiver, respectively, operable for interfacing with external devices.

Additionally, the computer device 400 may include a data store 440, which may be any suitable combination of hardware and/or software, that provides for mass storage of information, databases, and programs employed in connection with implementations described herein. For example, the data store 440 may be a data repository for operating system 460 (e.g., classical OS, or quantum OS). In one implementation, the data store 440 may include the memory 420.

The computer device 400 may also include a user interface component 450 operable to receive inputs from a user of the computer device 400 and further operable to generate outputs for presentation to the user or to provide to a different system (directly or indirectly). The user interface component 450 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 450 may include one or more output devices, including but not limited to a display, a speaker, a haptic feedback mechanism, a printer, any other mechanism capable of presenting an output to a user, or any combination thereof.

In an implementation, the user interface component 450 may transmit and/or receive messages corresponding to the operation of the operating system 460. In addition, the processor 410 may execute the operating system 460 and/or applications or programs, and the memory 420 or the data store 440 may store them.

When the computer device 400 is implemented as part of a cloud-based infrastructure solution, the user interface component 450 may be used to allow a user of the cloud-based infrastructure solution to remotely interact with the computer device 400.

Figure 5:
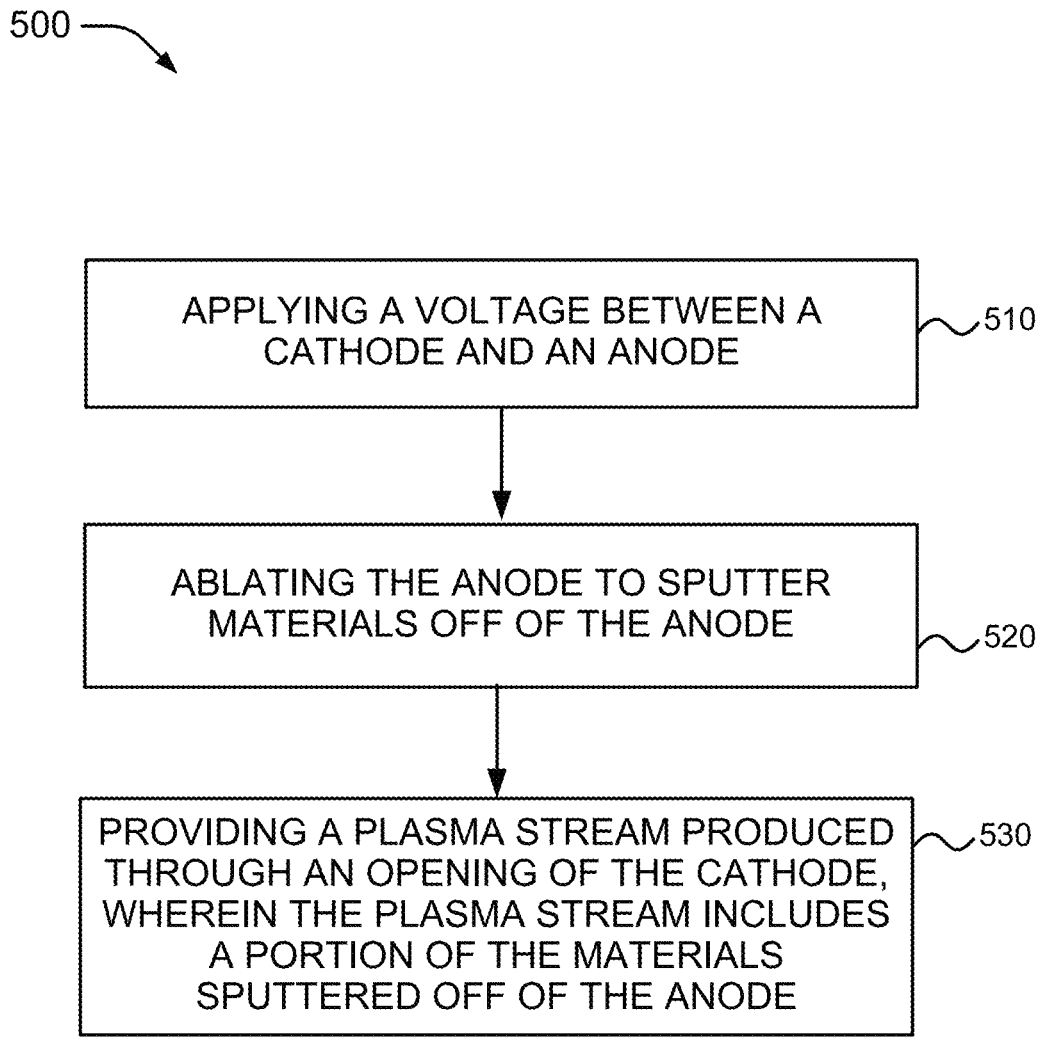
FIG. 5 is an example of a method for generating an atomic flux in accordance with aspects of the present disclosure.

Referring to FIG. 5, a method 500 for generating an atomic flux in an atomic oven associated with a trapped ion system. The functions of the method 500 may be performed by the atomic oven.

At 510, the method 500 includes applying a voltage (e.g., by the power supply 108) between a cathode (e.g., the cathode 102) and an anode (e.g., the anode 104).

At 520, the method 500 includes ablating (e.g., via the arc 120) via an anode (e.g., the anode 104) to sputter materials off of the anode (e.g., the anode 104) or locally heating the anode to evaporate materials off of the anode.

At 530, the method 500 includes providing a plasma stream (e.g., the plasma stream 122) produced through an opening of the cathode (e.g., the cathode 102), wherein the plasma stream includes a portion of the materials sputtered off of the anode or evaporated off the anode.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A quantum information processing (QIP) system comprising:
   an ion trap configured to trap a plurality of ions;
   an atomic oven configured to provide a plasma stream comprising a plurality of ions to the ion trap, the atomic oven comprising a cathode and an anode including a source material; and a power supply configured to provide a voltage between the cathode and the anode to generate the plasma stream from the source material of the anode; and a shield configured to direct the plurality of ions of the plasma stream towards the ion trap.

2. The QIP system of claim 1, wherein the power supply is configured to provide the voltage to cause a plurality of electrons from the cathode to ablate or evaporate the source material from the anode to produce the plasma stream of ablated or evaporated particles including the plurality of ions.

3. The QIP system of claim 1, wherein the atomic oven further comprises a holder configured to hold the cathode and that connects the cathode to the power supply.

4. The QIP system of claim 1, wherein the shield is positioned in a path of the plasma stream and includes an opening for the plasma stream to pass through.

5. The QIP system of claim 1, wherein the atomic oven further comprises a biasing circuit configured to generate a field that separates the plasma stream into a plurality of separate streams.

6. The QIP system of claim 5, wherein the plurality of separate streams comprises a first stream having the neutral particles and at least a second stream having the plurality of ions.

7. The QIP system of claim 1, further comprising a chamber that houses the ion trap and the atomic oven.

8. The QIP system of claim 7, further comprising one or more of a mechanical pump, a rotary pump, a cryogenic pump, or a turbo pump configured to provide ultra-high vacuum to the chamber.

9. The QIP system of claim 1, wherein the source material comprises ytterbium or barium; and the cathode comprises tungsten or graphite.

10. The QIP system of claim 1, wherein the atomic oven is part of a single, integrated module.

11. The QIP system of claim 1, wherein the power supply is configured to operate in a steady state mode to produce the plasma stream as a continuous stream or in a pulsed mode to produce the plasma stream as a pulsed stream.

12. The QIP system of claim 1, wherein the shield is biased with respect to at least one of the cathode and the anode, such that the shield is configured to reflect the plurality of ions from the plasma stream.

13. A quantum information processing (QIP) system comprising:

an ion trap configured to trap a plurality of ions;

an atomic oven comprising a cathode and an anode including a source material; and a power supply configured to provide a voltage between the cathode and the anode of the atomic oven to generate a plasma stream that from the source material of the anode, the plasma stream including the plurality of ions; and a holder that holds the cathode and is configured to direct the plasma stream towards the ion trap.

14. The QIP system of claim 13, wherein the power supply is configured to provide the voltage to cause a plurality of electrons from the cathode to ablate or evaporate the source material from the anode to produce the plasma stream.

15. The QIP system of claim 13, wherein the holder includes a shield that is positioned in a path of the plasma stream and includes an opening for the plasma stream to pass through to the ion trap.

16. The QIP system of claim 13, wherein the atomic oven further comprises a biasing circuit configured to generate a field that separates the plasma stream into a plurality of separate streams that include a first stream having the neutral particles and at least a second stream having the plurality of ions.

17. The QIP system of claim 13, further comprising:

a chamber that houses the ion trap and the atomic oven; and one or more of a mechanical pump, a rotary pump, a cryogenic pump, or a turbo pump configured to provide ultra-high vacuum to the chamber.

18. The QIP system of claim 13, wherein the source material comprises ytterbium or barium; and the cathode comprises tungsten or graphite.

19. The QIP system of claim 13, wherein the power supply is configured to operate in a steady state mode to produce the plasma stream as a continuous stream or in a pulsed mode to produce the plasma stream as a pulsed stream.

20. The QIP system of claim 15, wherein the shield is biased with respect to at least one of the cathode and the anode, such that the shield is configured to reflect the plurality of ions from the plasma stream.

\* \* \* \* \*